United States Patent Office 2,735,296
Patented Feb. 21, 1956

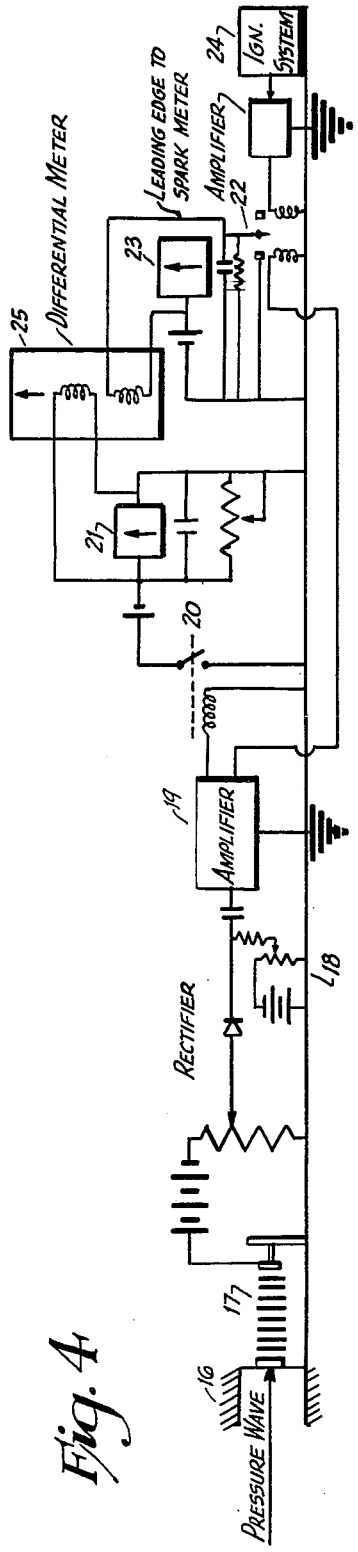

2,735,296

SPARK ADVANCE INDICATOR

Alfred E. Traver, Great Neck, N. Y., assignor to Socony Mobil Oil Company, Inc., a corporation of New York Application August 10, 1953, Serial No. 373,386

5 Claims. (Cl. 73—116)

This application is a continuation-in-part of my application Serial No. 261,307, filed December 21, 1951, now abandoned.

This invention has to do with an instrument for indicating the spark timing on spark ignition engines.

The spark timing on conventional engines is controlled by engine speed and intake manifold vacuum. There is no easy method for checking the operation of the centrifugal and vacuum spark advance mechanism after installation. Before installation, the advance mechanism may be checked on a bench tester.

After installation, the mechanism is set to spark at the desired number of degrees before top center by observing marks on the flywheel or vibration damper.

One method for checking the spark timing is to use a stroboscope, triggered by the spark pulse, to observe the timing mark on the flywheel. For use at higher engine speeds, special timing marks or scales must be installed. On most engines, the installation of calibration marks or scales is a major project.

Several electronic spark advance indicators have been made. These devices require the installation of a voltage pulse generator on some moving part of the engine. The voltage pulse turns on an electronic switch and the following spark pulse turns the circuit off. A change in spark time changes the period in which the electronic switch passes current. A current meter is then used which is calibrated to indicate the spark time relative to top center.

The installation of the voltage pulse generator is a time consuming procedure so that these instruments are used only on road test cars where stroboscopic methods are difficult to employ.

The invention has for its major object the provision of an instrumentation for obtaining spark advance which does not require the removal of the distributor or the alteration of the engine in any way. The improved apparatus and method uses the compression pressure in a non-firing cylinder for locating a fixed point in the engine cycle. The spark time can then be determined in relation to the fixed point obtained from the compression pressure.

It is well known that compression pressure reaches a maximum at top center position of the piston in a reciprocating engine, however, the change in pressure per degree of crankshaft rotation is negligible at this position so the determination of crank position by pressure at top center is not practical.

The compression pressure at an equal number of degrees before and after top center is also approximately equal. At forty-five degrees before and after top center, the pressure may change as much as 5 p. s. i. in a degree. A pressure operated switch will accurately indicate points 45 degrees before and after top center although it will not accurately indicate top center or points two degrees before and after top center.

When points angularly equidistant from top center are known, the top center position can be determined with equal accuracy by dividing the angular distance between the two known points. The equidistant points may vary in position, but the top dead center indication remains fixed.

The angular distance between the "make" and "break" of the pressure operated switch can be determined by measuring the average current flow through the switch. The averaging meter may also be calibrated in crankshaft degrees from "make" to top center.

The angular distance between the pressure switch "make" and the spark pulse may be determined by using an electronic switch which is turned on by the pressure switch "make" and turned off by the spark pulse. The meter reading the average current flow can be calibrated in crankshaft degrees.

These two angle meters could be read separately to determine spark advance. However, it would be simpler to combine these readings on a differential meter and read the spark advance directly.

In order to more clearly explain this invention, reference is now made to the drawings which are attached to and form a part of this specification. In these drawings:

Figure 4 is a wiring diagram of a second useful instrumentation set-up.

Figure 5 is a wiring diagram of a third form of wiring set-up which has certain advantages over that of Figures 1 and 4.

Figure 2:
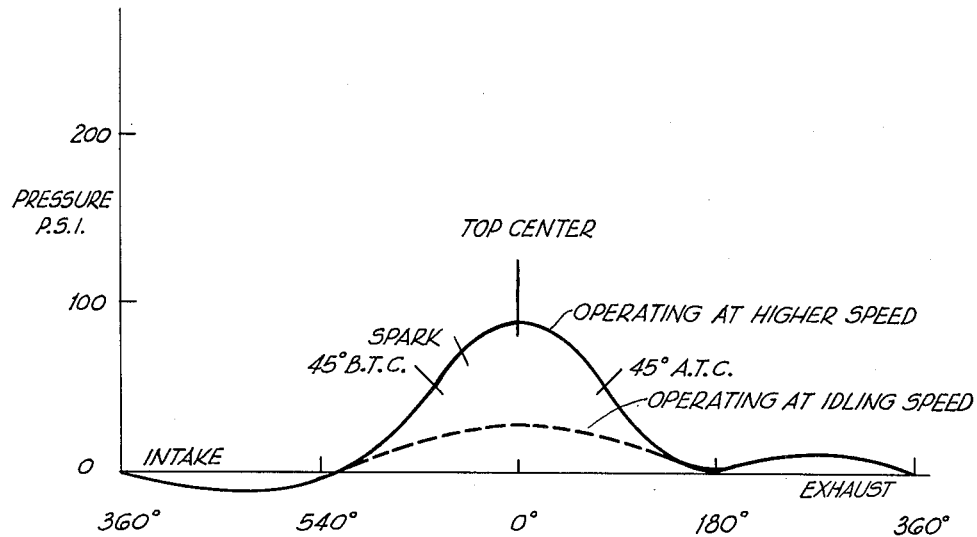
Figure 2 is a diagrammatic representation of the pressure cycle within a cylinder.
Figure 3:
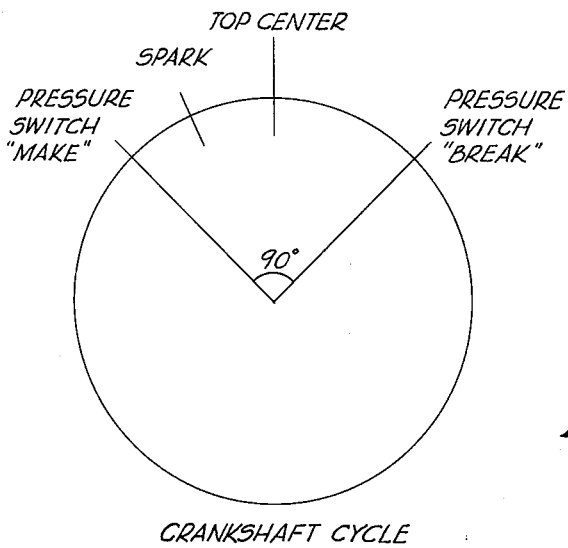
Figure 3 is a diagram of the crankshaft cycle.

In these drawings, Figures 2 and 3 relate to the discussion of cycle events and cycle pressures discussed hereinbefore. Figure 2 shows the pressure relationships within a selected cylinder through two crankshaft cycles (720°) wherein an intake period (360°–540°) is followed by a compression (540°–180°), in this case without sparking and combustion, followed by an exhaust period (180°–360°). Pressure relationships at lower speeds (idling) are shown by the dotted line between 540°–180°, and at higher speeds, shown by the solid line in the same range. Figure 3 shows the relationship between top dead center, the spark event, the pressure switch "make" and the pressure switch "break" when the pressure switch is so adjusted as to make and break 45° before and after top dead center, respectively.

Figure 1:
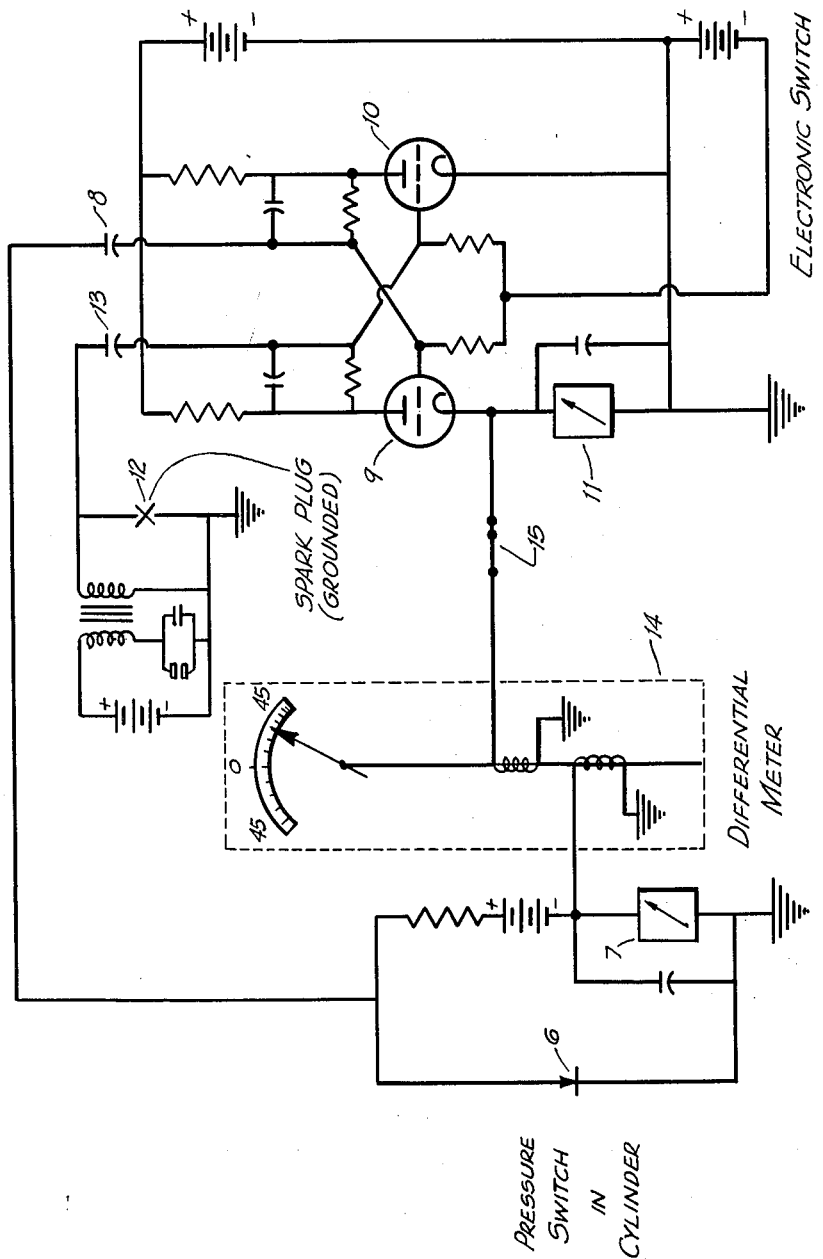
Figure 1 is a diagram of one variety of instrumentation set-up.

Turning now to Figure 1, there is shown at 6 a "balanced pressure" switch of known type. This switch makes use of a balanced pressure diaphragm, mounted in a threaded cylinder, which is placed in the spark plug opening after removal of the spark plug. Cylinder pressure upon the cylinder side of the diaphragm is opposed by an adjustable pressure of known amount upon the back side of the diaphragm, and consequently movement of the diaphragm and closure of the electric circuit in which it functions as a switch can be had at any preselected cylinder pressure level. Such switches are well known and used for various purposes in examination of cylinder events. In the present instance, the balancing pressure level is so selected that the switch closes before top cylinder pressure (top dead center) a sufficient amount to provide closure before spark. The spark plug, removed from the cylinder, is referred to later herein. Closure of switch 6 initiates current flow in the circuit comprising meter 7, which is then stopped by opening of the switch. Meter 7 should be an averaging meter, capable of giving the average of the successive increments of flow through this circuit as switch 6 makes and breaks while the engine is in operation.

Obviously, the pressure-actuated switch need not be of the balanced pressure diaphragm type disclosed. Various types of spring loaded adjustable pressure responsive mechanisms may be used if designed with sufficient sensitivity and flexibility to be properly responsive, in accuracy, speed, and reproducibility. Spring loaded diaphragms and spring loaded pistons may be used to actuate such switches.

The initiation of current flow through switch 6, operating through condenser 8, is utilized by an electronic switching system composed of triodes 9 and 10 and related circuit elements, comprising an electronic switch of known type, to initiate flow of current through a circuit including a second averaging meter 11. Now we return to spark plug 12. This spark plug, although removed from its cylinder to be replaced by the switch 6, is maintained in operative condition, with proper grounding to the engine so that it will "fire" at the customary cycle point in the cycle of the selected cylinder. When spark plug 12 so fires, the electrical impulse generated thereby, acting through condenser 13 and the electronic switch, serves to stop the flow of current in the circuit including meter 11. Meter 11 is also an averaging meter, averaging the values of the successive increments of current delivered in the intervals between closure of switch 6 and the spark event.

Returning to meter 7, it will be noted that this circuit may be so adjusted that when switch 6 is held closed, the meter will swing full range. In terms of crankshaft cycle, referring to Figure 2, this would be 720°, and the needle zero of the meter would correspond to no closure of 6 at all. Consequently, this meter can be calibrated in degrees before top dead center. That is, if the make is 45° before TDC and the break is 45° after TDC the meter indication will be $90/720$ or $\frac{1}{8}$ of the scale length, and this point can be marked as 45°, and similarly for other points, which calibration remains good regardless of the balancing pressure needed to secure closure of 6 at the selected 45° before TDC.

Meter 11 obviously shows no current if spark firing occurs simultaneously with closure of 6, and, with proper circuit design, would show full swing if the plug did not fire until just as switch 6 opened, so its scale may be calibrated to show the proportion of time between make and break of switch 6 which elapses before spark plug 12 fires. Here, by comparison of these values, we may determine the cycle position of the spark event.

This is done most conveniently by a differential meter 14, in which the output of the meter 7 circuit is opposed by the output of the meter 11 circuit. The constants of this differential meter, in connection with the associated circuits of meters 7 and 11, are conveniently so designed that if the spark event occurs at TDC the differential meter will be at the half scale point, which will permit this scale to be marked for both spark advance and spark retard. Obviously basic calibration of this entire system may be done electrically or by use of a laboratory engine, but having been done once, with proper values of circuit elements worked out, the major calibration of the system may be built in, with only the usual provisions for minor adjustment customarily utilized in electrical instrumentation.

With a set of circuits so provided, the use of meters 7 and 11 may be dispensed with unless they are retained for indicating purposes.

One point should be observed. In setting up on an "unknown" engine the setting of the back-up pressure on switch 6 must be sufficient to embrace the make to break range within which the spark setting may be found. This can be gotten by retaining meter 7 as an indicator, and applying pressure to switch 6 until a satisfactory scale range is attained on meter 7. It may also be done, in the absence of meter 7, by opening a switch 15 (which need be installed only if meter 7 is dispensed with), in which case, with the spark event current not affecting differential meter 14 the swing of this meter will indicate whether or not the pressure on switch 6 is low enough to embrace a sufficient range. (See Figure 2. As the balance pressure goes up a lesser range is embraced.)

Another point to be watched is this: The indicator of Figure 1 will work satisfactorily at part throttle and full throttle for all speeds, but upon some engines, it cannot be used at high speed idling. Upon one make of engine, at high speed the automatic spark advance may set the spark as early as 50° before TDC. With the throttle nearly closed, compression pressure is not much above atmospheric pressure at 50 degrees before TDC, and the exhaust pressure wave can reach a level higher than that existing at 50 degrees before TDC. Obviously, then, the pressure switch will be open during the exhaust cycle if it also opens early enough to embrace 50 degrees before TDC. The cure is to operate at an appropriate speed and throttle condition.

Turning to Figure 4 there is shown another form of instrumentation. In this figure, the cylinder is diagrammatically shown at 16, and the pressure switch of Figure 1 is replaced by a transducer hook-up, actuated by a carbon pile 17. This pressure actuated element may be any form of adjustable device whereby pressure in excess of a preselected value can act to control the flow of current, such as, for example, the carbon pile shown, a strain gauge-connected pressure diaphragm, a piezo-electric crystal set-up, a variable capacitor, a variable inductance set-up, a vibraton vacuum tube with plate-to-cathode distance variable, or the like, all well known to the art. The impulse thus generated is sent through a rectifier and conventional clipper device 18, and at 19 is amplified and so handled as to give rise to a square wave form, which impulse, with the closing of relay 20, imposes in the circuit containing integrating and averaging meter 21 and on that meter a series of electrical impulses, the duration of which is proportional to the time during which the cylinder pressure remains above the preselected level. Similarly, in the same manner, through relay 22 there is a similar series of impulses in the circuit containing meter 23, but the spark plug, maintained in operative condition, as before, as indicated by diagram item 24, is used to give rise to an impulse which reverses relay 22. The result is that the current impulses integrated and averaged on meter 23 are proportional to the duration of time in which the cylinder pressure is above the preselected pressure prior to the firing of the spark plug. Then, these two impulses are fed in oppositiion to the differential meter 25, to give an indication of the position of the spark event.

Figure 5 is a somewhat different circuit, wherein items 16, 17, 18, 19, 20, 21, 23, 24, 25 are the same as in Figure 4, and the impulses measured in meter 21 are the same as before. The difference arises in the second part of the circuit. Relay 26 is so provided and arranged in conjunction with relay 27, that the spark event initiates a series of impulses, which are measured in meter 23 and the trailing edge of the square wave from 19 terminates those impulses. Thus, at 23, in this case, there is a series of impulses proportional to the interval in which the cylinder pressure is above the preselected pressure after the spark event. Once again, the two series of impulses are fed in opposition to differential meter 25 to give an indication of the position of the spark event.

The circuit of Figure 5 is particularly useful in that it is not limited, in connection with high speed idling on some engines, as are the systems of Figures 1 and 4. The difficulty is avoided by using the period of time after the spark event instead of the period of time prior to spark event.

It will of course be noted that other and perhaps more effective circuit components, well known in the art, may be used without departing from the spirit of this invention.

I claim:

1. Apparatus for determining spark setting in an operating spark ignition engine comprising a pressure operated switch to be inserted in the spark plug opening of a selected cylinder, means for adjusting the operating pressure on said switch to cause it to close by compression pressure a sufficient time before top dead center to be closed when the spark event occurs and to permit its opening at an equal length of time after top dead center, a first electrical circuit closed by said switch and in said circuit measuring means to determine the portion of the engine operation cycle during which the switch remains closed, a second electrical circuit, means whereby the closing of said switch initiates current flow in said second circuit, means to maintain the removed spark plug operative to produce a spark while removed from the selected cylinder, means operated by the firing of said spark plug to stop the flow of current in said second circuit, and measuring means to determine the portion of the engine operative cycle during which the second circuit remains closed, whereby, from comparison with the reading from the first circuit the position of the spark event in the engine cycle can be determined.

2. Apparatus for determining spark setting in an operating spark ignition engine comprising a balanced pressure diaphragm type switch to be inserted in the spark plug opening of a selected cylinder, means for adjusting the balancing pressure on said switch to cause it to close by compression pressure a sufficient time before top dead center to be closed when the spark event occurs and to permit its opening at an equal length of time after top dead center, a first electrical circuit closed by said switch and in said circuit measuring means to determine the portion of the engine operation cycle during which the switch remains closed, a second electrical circuit, of similar characteristics, means whereby the closing of said switch initiates current flow in said second circuit, means to maintain the removed spark plug operative to produce a spark while removed from the selected cylinder, means operated by the firing of said spark plug to stop the flow of current in said second circuit, and measuring means to determine the portion of the engine operative cycle during which the second circuit remains closed, the said first and second measuring means being utilized as opposing elements in a differential measuring means, the response of which is indicative of the position of the spark event in the operative cycle of the engine.

3. Apparatus for determining the spark setting of an operating spark ignition engine with respect to the instantaneous position of a piston in its path of travel in a selected cylinder comprising means to maintain a spark plug which has been removed from the selected cylinder of said engine in sparking condition, sealing means for the spark plug opening of said selected cylinder, pressure responsive means carried by said sealing means and responsive to the pressure in the cylinder for generating a series of electrical impulses the duration of each being proportional to the time during which the pressure within the selected cylinder is above a preselected pressure level, said time being long enough to embrace the spark event, means electrically cooperating with said first impulse producing means for producing a second series of electrical impulses the duration of which is proportional to the time intervening between the spark event and a selected end of the period of time during which the pressure produced series of impulses are being generated, separate integrating means for integrating each series of impulses, and means responsive to the differential action of both integrated signals for producing an indication that is a measure of the spark setting with respect to the instantaneous position of the piston.

4. Apparatus for determining the spark setting of an operating spark ignition engine with respect to the instantaneous position of a piston in its path of travel in a selected cylinder comprising means to maintain a spark plug which has been removed from the selected cylinder of said engine in sparking condition, sealing means for the spark plug opening of said selected cylinder, pressure responsive means carried by said sealing means and responsive to the pressure in the cylinder for generating a series of electrical impulses the duration of each being proportional to the time during which the pressure within the selected cylinder is above a preselected pressure level, said time being long enough to embrace the spark event, separate means initiated simultaneously with the first impulse producing means for producing a second series of electrical impulses, means operable by the spark event to render the second impulse producing means inoperable, differential metering means, and means for impressing said first and second series of impulses on said metering means to give a reading that is indicative of the spark setting of the engine with respect to top dead center of the piston.

5. Apparatus for determining the spark setting of an operating spark ignition engine with respect to the instantaneous position of a piston in its path of travel in a selected cylinder comprising means to maintain a spark plug which has been removed from the selected cylinder of said engine is sparking condition, sealing means for the spark plug opening of said selected cylinder, pressure responsive means carried by said sealing means and responsive to the pressure in the cylinder for generating a series of electrical impulses the duration of each being proportional to the time during which the pressure within the selected cylinder is above a preselected pressure level, said time being long enough to embrace the spark event, separate means initiated simultaneously with the first impulse producing means for producing a second series of electrical impulses, said second series of impulses having an intensity substantially equal to that of the first impulses but of opposite instantaneous polarity, separate integrating means for integrating each series of impulses, differential metering means, means for introducing the integration signals to said meter, means initiated by the spark event for rendering the second impulse producing means inoperate during the interval of time between the spark event and the time at which the cylinder pressure drops to the selected pressure, whereby the meter will give an indication during this interval that is proportional to the spark setting with respect to top dead center of the piston in the cylinder.

References Cited in the file of this patent

UNITED STATES PATENTS

| | | |
|---|---|---|
| 2,263,859 | Eldredge | Nov. 25, 1941 |
| 2,577,835 | Williams | Dec. 11, 1951 |
| 2,666,325 | Withers et al. | June 19, 1954 |